United States Patent [19]

Lundgren, Sr.

[11] Patent Number: 4,488,510
[45] Date of Patent: Dec. 18, 1984

[54] HAY FEEDER

[76] Inventor: George L. Lundgren, Sr., Rte. 2, Box 234A, Kearney, Nebr. 68847

[21] Appl. No.: 535,267

[22] Filed: Sep. 23, 1983

[51] Int. Cl.³ .............................................. A01K 1/10
[52] U.S. Cl. ...................................................... 119/60
[58] Field of Search ................. 119/60, 58; D30/2, 13

[56] References Cited

U.S. PATENT DOCUMENTS

| D. 11,853 | 7/1880 | Wiard | 119/60 X |
|---|---|---|---|
| 54,005 | 4/1866 | Moore | 119/60 |
| 655,504 | 8/1900 | Morris | 119/60 |
| 692,382 | 2/1902 | Swinton | 119/58 |
| 1,032,747 | 7/1912 | Evans | 119/58 |
| 3,362,382 | 1/1968 | Frasier | 119/58 |
| 4,020,794 | 5/1977 | Nethery | 119/58 |
| 4,285,300 | 8/1981 | Spane | 119/58 |
| 4,294,197 | 10/1981 | Snel | 119/60 |

Primary Examiner—Hugh R. Chamblee
Attorney, Agent, or Firm—Zarley, McKee, Thomte, Voorhees & Sease

[57] ABSTRACT

A hay feeder is described for installation in the corner of a box stall or the like including a pair of vertically disposed transversely extending back wall portions secured to the sides or walls of the box stall. An arcuate front wall portion extends between the back wall portions to define a hay storage compartment having an open upper end. The front wall portion has spaced-apart access openings formed therein to permit an animal to feed therethrough. The access openings have a vertical height substantially less than the vertical height of the front wall portions. The hay feeder is comprised of a thermoplastic material such as polyethylene and is provided with strengthening ribs on the front wall portion.

2 Claims, 4 Drawing Figures

HAY FEEDER

BACKGROUND OF THE INVENTION

This invention relates to a hay feeder and more particularly to a flexible thermoplastic hay feeder.

Many types of hay feeders have been previously employed in box stalls or the like to permit an animal such as a horse to feed. Historically, the hay feeders have been comprised of metal or wood material. In the metal feeders, a plurality of spaced-apart metal bars support the hay and define feed openings therebetween. In both the metal and wooden hay feeders, the animals sometime damage the same. A further disadvantage in the metal and wood hay feeders is that a great deal of hay is wasted since the metal bars or wooden boards do not adequately maintain the hay within the feeder.

Therefore, it is a principal object of this invention to provide an improved hay feeder.

A further object of the invention is to provide a hay feeder comprised of flexible thermoplastic material such as polyethylene or the like.

A further object of the invention is to provide a hay feeder which prevents the waste of hay.

Still another object of the invention is to provide a hay feeder which is virtually indestructable.

Still another object of the invention is to provide a hay feeder which is lightweight and easily installed in a box stall or the like.

Yet another object of the invention is to provide a hay feeder having increased capacity.

These and other objects will be apparent to those skilled in the art.

SUMMARY OF THE INVENTION

Figure 1:
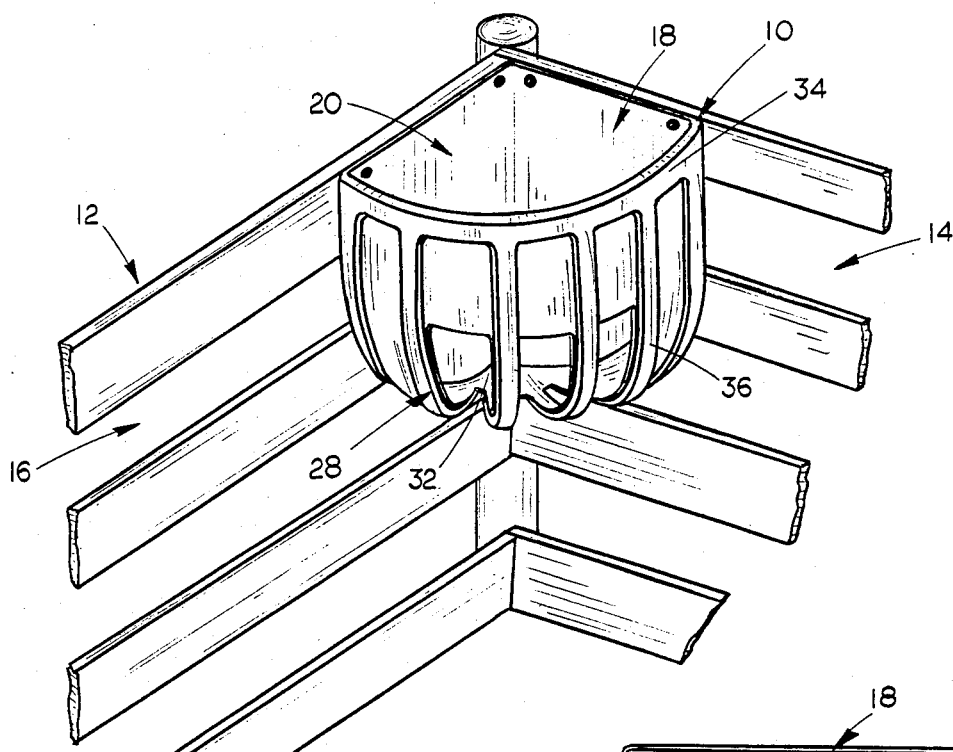
FIG. 1 is a perspective view of the hay feeder of this invention mounted in the corner of a box stall.
Figure 2:
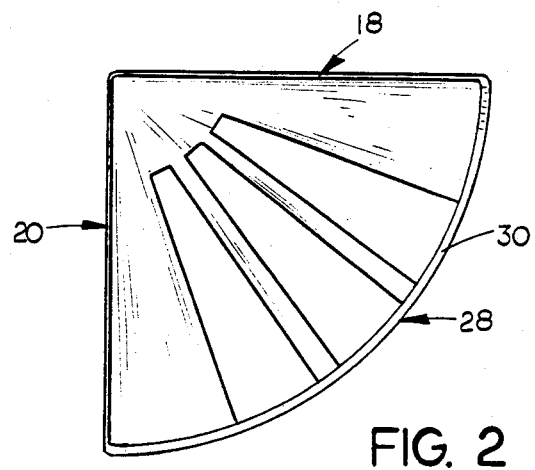
FIG. 2 is a top view of the hay feeder.

A hay feeder is disclosed for positioning in the corner of a box stall or the like. The hay feeder is preferably comprised of a flexible plastic material such as polyethylene so that it is practically indestructable. The hay feeder comprises a pair of transversely extending back wall portions which are secured to the corner walls of the box stall by screws or the like. An arcuate front wall portion extends between the outer edges of the back wall portions to define a hay storage compartment having an open upper end. The front wall portion has spaced-apart access openings formed therein to permit the animal to feed therethrough. The access openings have a vertical height substantially less than the vertical height of the front wall portion. Strengthening ribs are provided on the front wall portion to provide greater durability to the hay feeder.

DESCRIPTION OF THE PREFERRED EMBODIMENT

The hay feeder of this invention is referred to generally by the reference numeral 10 and is designed to be mounted in the corner of a box stall or the like referred to generally by the reference numeral 12 and including corner walls 14 and 16. Although the corner walls 14 and 16 are illustrated as being comprised of spaced-apart boards, the corner walls could be uninterrupted if desired.

Figure 3:
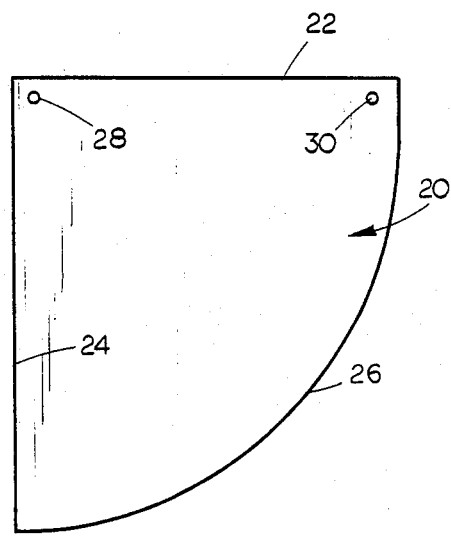
FIG. 3 is a rear view of one of the back walls of the hay feeder.

Hay feeder 10 is preferably comprised of a flexible thermoplastic material such as polyethylene having a thickness of approximately $\frac{1}{4}$ to $\frac{1}{2}$ inch. Hay feeder 10 includes a pair of vertically disposed and transversely extending back wall portions 18 and 20. Back wall portions 18 and 20 are identical and it can be seen in FIG. 3 that the configuration of the back wall portion is generally "triangular" in shape. As seen in FIG. 3, back wall portion 20 has an upper edge 22, inner edge 24 and an arcuate outer edge 26. Back wall portion 20 is also provided with openings 28 and 30 formed therein to facilitate the attachment of the hay feeder to the wall. Inasmuch as back wall portion 18 is identical to back wall portion 20, back wall portion 18 will not be described in detail.

Figure 4:
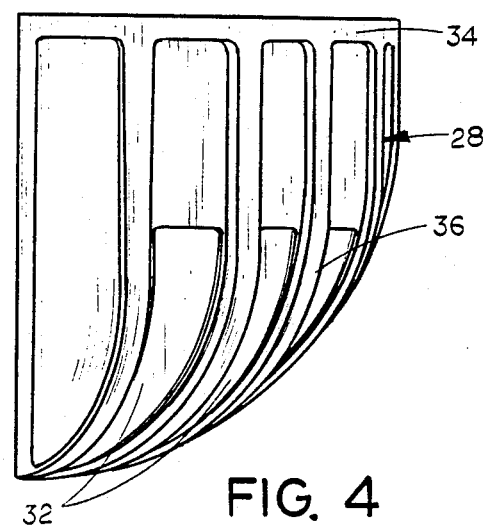
FIG. 4 is a side view of the hay feeder.

An arcuate front wall portion 28 extends between the outer edges of the back wall portions 18 and 20. The configuration of the front wall portion 28 is best illustrated in FIG. 4. The upper edge 30 of front wall portion 28 is arcuate and it can be seen that the front wall portion 28 tapers downwardly and inwardly to the lower ends of the back wall portions 18 and 20. Front wall portion 28 is provided with spaced-apart access openings 32 formed therein to permit an animal such as a horse to feed therethrough. The vertical height of the access openings 32 is substantially less than the vertical height of the front wall portion 28. As seen in FIG. 1, the width of the access openings 32 progressively decrease from the upper to lower ends thereof. Front wall portion 28 is provided with a strengthening rib 34 at its upper end and a plurality of spaced-apart strengthening ribs 36 extending downwardly therefrom.

In use, the hay feeder is mounted in the corner of the stall by screws being extended through the openings formed in the upper ends of the back wall portions 18 and 20. Hay is then supplied to the interior of the hay feeder through the open upper end thereof. The animal may feed on the hay through the access openings 32. The configuration of the access openings 32 is such that the hay will be properly maintained within the interior of the hay feeder and will not fall to the ground. The decreasing width of the access openings from the upper to lower ends thereof aids in preventing the waste of hay. The arcuate front wall configuration of the hay feeder also provides additional storage capability for the feeder. The flexible nature of the hay feeder results in a virtually indestructable feeder being provided.

Thus it can be seen that the hay feeder of this invention accomplishes at least all of its stated objectives.

I claim:

1. A hay feeder comprising,
  a vertically disposed first back wall portion adapted to be secured to a vertically disposed first wall,
  a vertically disposed second back wall portion extending at a right angle to said first back wall portion and adapted to be secured to a vertically disposed second wall,
  and an arcuate front wall portion extending between said back wall portions to define a hay storage compartment having an open upper end,
  each of said back wall portions having arcuate outer edges, each of said outer edges extending downwardly and inwardly from its upper end, said arcuate front wall portion extending downwardly and inwardly in an arcuate fashion from its upper end towards its lower end, said front wall portion having a horizontally disposed strengthening rib at its upper end, said front wall portion having a plurality of spaced-apart strengthening ribs extending downwardly from said horizontally disposed strengthening rib, said front wall portion having access openings formed therein between at least some of said downwardly extending strengthening ribs, said access openings permitting an animal to feed therethrough, said access openings having a vertical height substantially less than the vertical height of said front wall portion, said back wall portions and said front wall portion being comprised of a thermoplastic material.

2. The hay feeder of claim 1 wherein the lower ends of said access openings terminate closely adjacent said back wall portions.

* * * * *